United States Patent
Hitotsuyanagi et al.

(10) Patent No.: US 8,632,649 B2
(45) Date of Patent: Jan. 21, 2014

(54) METHOD OF FABRICATING PNEUMATIC TIRE AND PNEUMATIC TIRE

(75) Inventors: Mitsuru Hitotsuyanagi, Osaka (JP); Tetsuo Tatara, Osaka (JP); Shigeo Kudo, Osaka (JP); Osamu Fujiki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 441 days.

(21) Appl. No.: 12/439,670

(22) PCT Filed: Aug. 31, 2006

(86) PCT No.: PCT/JP2006/317194
§ 371 (c)(1),
(2), (4) Date: Mar. 2, 2009

(87) PCT Pub. No.: WO2008/026275
PCT Pub. Date: Mar. 6, 2008

(65) Prior Publication Data
US 2009/0314401 A1    Dec. 24, 2009

(51) Int. Cl.
*B29D 30/60* (2006.01)
*B60C 19/08* (2006.01)

(52) U.S. Cl.
USPC .......... 156/117; 152/152.1; 152/DIG. 2; 264/211.23

(58) Field of Classification Search
USPC .......... 156/117, 130, 397; 152/152.1, DIG. 2; 264/211.23; 425/131.1, 462, 465
See application file for complete search history.

(56) References Cited

U.S. PATENT DOCUMENTS

| | | | | |
|---|---|---|---|---|
| 5,725,814 A | * | 3/1998 | Harris | 264/40.3 |
| 5,942,069 A | * | 8/1999 | Gerresheim et al. | 156/128.1 |
| 2006/0042733 A1 | | 3/2006 | Matsui | |
| 2006/0042737 A1 | * | 3/2006 | Hayashi et al. | 152/209.1 |
| 2007/0017615 A1 | * | 1/2007 | Nobuchika et al. | 152/152.1 |

FOREIGN PATENT DOCUMENTS

| | | | |
|---|---|---|---|
| JP | 2002-355878 A | * | 12/2002 |
| JP | 2004-338621 A | | 12/2004 |
| JP | 2005-41055 A | | 2/2005 |
| JP | 2006-69341 A | | 3/2006 |

OTHER PUBLICATIONS

Written Opinion of the International Searching Authority from International Application PCT/JP2006/317194. Date Unknown.*
International Search Report of PCT/JP2006/317194, mailing date of Oct. 31, 2006.

* cited by examiner

*Primary Examiner* — Michael Tolin
(74) *Attorney, Agent, or Firm* — Westerman, Hattori, Daniels & Adrian, LLP

(57) ABSTRACT

An object is to reduce a cycle time for fabricating a low rolling resistance pneumatic tire and to provide the same pneumatic tire. As a means therefor, in building a tread portion by winding spirally a rubber strip material whose cross section is divided into a first region made of a conductive rubber and a second region made of a non-conductive rubber in a tire circumferential direction in a partially overlapping fashion by the use of an extruding machine which extrudes continuously the rubber strip material, an area ratio of the first region relative to the cross section of the rubber strip material is made to change in a tire width direction.

8 Claims, 10 Drawing Sheets

METHOD OF FABRICATING PNEUMATIC TIRE AND PNEUMATIC TIRE

TECHNICAL FIELD

The present invention relates to a fabrication method for a pneumatic tire having a static elimination function and a pneumatic tire.

BACKGROUND ART

In general, tires are configured in such a manner as to include a plurality of tire rubber members and a plurality of reinforcement members which are mainly made up of cords. In a representative tire, as is shown in FIG. 1, respective portions such as an inner liner rubber portion 1, a tread rubber portion 2, side wall rubber portions 3, rim strip rubber portions 4 and the like are formed by rubber members which match properties required for the respective portions and these rubber members are combined with a carcass layer 5 which constitutes a cord-contained reinforcement member, a belt layer 6 and bead portions 7 to thereby make up a tire T1.

To build rubber members which make up the respective portions, rubber materials were extruded continuously to be built into rubber strips from an extruding machine via dies which match cross sectional shapes of the respective rubber members, and thereafter, the extruded rubber strips were cut to constant dimensions to thereby obtain target rubber members. In building a tire, the rubber members were sequentially affixed together on a rotational support element such as a building drum.

In addition, in recent years, in order to reduce the rolling resistance of a tire, tread rubbers have been developed which use silica instead of carbon black as a strengthening agent. However, since the tread rubbers have an electric resistance which is higher than that of tread rubbers which is compounded with only carbon black, there has been caused a problem that static electricity conducted from a vehicle body or electricity generated by virtue of internal friction when rubber deforms is accumulated. Then, there have been proposed pneumatic tires with a static elimination function which are made up in parallel of a non-conductive rubber which contains silica or the like and a conductive rubber which is compounded with carbon black or the like so that electricity generated in the vehicle body is made to be discharged to the road surface from a tread surface thereof.

For example, there has been proposed a method for building up a tread portion with a static elimination function by winding sequentially both a non-conductive rubber strip member and a highly conductive rubber strip member along a circumferential direction of a tire in a spiral fashion in such a manner that the non-conductive and highly conductive rubber strip members are disposed in an alternate fashion (for example, refer to Patent Document No. 1 below).

However, to satisfy the demand for a further reduced rolling resistance, there has been proposed a constitution in which a non-conductive rubber strip member and a conductive rubber strip member are disposed alternately in part of a tread portion in a tire width direction such as both side portions of the tread portion in the tire width direction or a central portion of the tread portion in the tire width direction. However, the following problem will emerge in building the tread portion using the method described above.

Namely, in the aforesaid building method, since the respective rubber strip members are disposed alternately by winding the non-conductive rubber strip member and the conductive rubber strip member on to the drum in an overlapping fashion, the rotation of the drum has to be stopped in the midst of the winding operation in order to start the supply of a highly conductive rubber strip member, this resulting in a problem that a fabrication cycle time is lengthened largely.

Patent Document No. 1: JP-A-2004-338621

DISCLOSURE OF THE INVENTION

Problem that the Invention is to Solve

The invention has been made in view of the problem, and an object thereof is to provide a pneumatic tire which can reduce the rolling resistance thereof and which is easy to be fabricated with a short fabrication cycle time and a method for fabricating the pneumatic tire.

Means for Solving the Problem

The invention provides a method of fabricating a pneumatic tire for forming a tread portion by winding spirally a rubber strip member in a circumferential direction of a tire in a partially overlapping fashion, characterized in that by the use of an extruding machine for extruding continuously a rubber strip member whose cross section is divided into a first region which is made up of a conductive rubber and a second region which is made up of a non-conductive rubber, the rubber strip member is wound on to a drum while changing an area ratio of the first region relative to a cross section of the rubber strip member in a tire width direction.

According to the invention, since the rubber strip member whose cross section is divided into the first region which is made up of the conductive rubber and the second region which is made up of the non-conductive rubber is extruded from the extruding machine continuously and the rubber strip member so extruded is wound on to the drum, the area ratio of the first region which is made up of the conductive rubber relative to the whole cross section of the rubber strip member can arbitrarily changed without stopping the rotation of the drum during the rubber strip member winding operation, thereby making it possible to fabricate the pneumatic tire in which the conductive rubber is disposed partially in the tread portion in the tire width direction without increasing the fabrication cycle time.

In the method of fabricating a pneumatic tire of the invention, the first region which makes up the cross section of the rubber strip member may be provided wider than the second region, whereby in the event that the tread portion is made to be formed by the rubber strip member which is now made to comprise a plurality of layers by folding the rubber strip member to an outer circumferential side of the tire, the conductive rubber in the rubber strip member can be brought into contact with itself in an ensured fashion in such a state that the conductive rubber intersects itself on an interface between the respective layers.

In addition, in the fabrication method, the rubber strip member may be extruded into a cross sectional shape whose thickness is gradually reduced from a widthwise central portion towards both sides thereof, whereby not only can the tread portion be extruded with good accuracy, but also the occurrence of a defect of air trap can be prevented which occurs in a surface of the tire.

Furthermore, in the fabrication method, the rubber strip member may be extruded in such a manner that the area ratio of the first region in both side portions in the tire width direction becomes larger than in a central portion in the tire width direction, whereby a pneumatic tire with a static elimination function can be fabricated in which the amount of conductive rubber which is contained in the tread portion is suppressed.

The invention also provides a pneumatic tire in which a rubber strip member is wound spirally in a tire circumferential direction in a partially overlapping fashion on a drum at least at a tire outer circumferential side portion of a tread portion, characterized in that a cross section of the rubber strip member is divided into a first region which is made up of a conductive rubber and a second region which is made up of a non-conductive rubber, and an area ratio of the first region relative to the cross section of the rubber strip member changes in a tire width direction.

Advantage of the Invention

According to the invention, the pneumatic tire can be fabricated in which the conductive rubber is disposed in an arbitral position of the tread portion in the tire width direction without increasing the fabrication cycle time, thereby making it possible to deal with a change in tire construction in a flexible fashion.

BEST MODE FOR CARRYING OUT THE INVENTION

First Embodiment

Hereinafter, a first embodiment of the invention will be described based on the drawings.

FIG. 1 is a sectional view showing an example of a pneumatic tire which is fabricated by a fabrication method according to the embodiment, and FIG. 2A, 2B shows sectional views of rubber strip members which are used in the fabrication method.

A pneumatic tire (hereinafter, referred to as a tire) T1 which is to be fabricated in this embodiment includes, for example, as is shown in FIG. 1, a pair of bead portions 7, side wall portions 3 which extend in a tire radial direction from the bead portions 7, respectively, and a tread portion 2 which is provided between the side wall portions 3, and a carcass layer 5 which is made up of carcass plies establishes a reinforcement between the bead portions 7. An inner liner portion 1 and a belt layer 6 in which two internal and external belt plies are laminated together are provided, respectively, on an inner circumference and an outer circumference of the carcass layer 5 so as to hold an air pressure.

The tread portion 2 is made up of shoulder portions 2a, 2a which are provided on both sides in the tire width direction and a tread central portion 2b which is provided between both the shoulder portions 2a, 2a, and the shoulder portions 2a and the tread central portion 2b are built by a rubber strip member 10 being wound in an overlapping fashion.

This rubber strip member 10 is formed into a ribbon shape having a flat cross sectional shape such as a substantially crescent shape, a flat substantially triangular shape or a flat substantially trapezoidal shape in which mainly a widthwise central portion is made thickest and the thickness is gradually reduced from this central portion towards both sides.

To describe in greater detail, a rubber strip member 10a which makes up the shoulder portions 2a, 2a has, as is shown in FIG. 2A, a cross section which is made up of a conductive rubber region (a first region) 12a made of a conductive rubber material and a non-conductive rubber region (a second region) 14a made of a non-conductive rubber material, and the conductive rubber region 12a is provided wider than the non-conductive rubber 14a. On the other hand, a rubber strip member 10b which makes up the tread central portion 2b is, as is shown in FIG. 2B, made up of a non-conductive rubber region (a second region) 14b only and does not have a conductive rubber region made of a conductive rubber material.

An example of a rubber strip member 10 which is used in this embodiment will be described by reference to FIG. 2A. A cross section of the rubber strip member 10 has a substantially crescent shape having a width dimension W of 5 to 50 mm and a thickness dimension T1 of 0.5 to 30 mm, and a thickness dimension T2 of the conductive rubber region 12a of the rubber strip member 10a becomes 0.05 to 0.2 mm. In addition, although the dimensions and shape of the rubber strip is not specifically limited to those described above, the cross sectional shape is preferably small from the viewpoint of dimensional accuracy of the tread portion and weight balance and uniformity of the tire.

Here, the conductive rubber material which makes up the first region denotes a conductive rubber compound having a specific volume resistance of less than $10^8$ $\Omega \cdot$cm, and for example, a rubber compound can be raised as an example which contains much carbon black as a strengthening agent. The conductive rubber material can be obtained by compounding, other than carbon black, a predetermined amount of a known conductivity imparting material such as a carbon-based material including carbon fiber, graphite or the like and a metal-based material including metallic powder, metallic oxide, metallic flakes, metallic fiber or the like. In addition, the non-conductive rubber material which makes up the second region denotes a non-conductive or insulating rubber compound having a specific volume resistance of $10^8$ $\Omega \cdot$cm or more, and for example, a rubber compound can be raised as an example which is compounded with, in place of carbon black, silica in a high proportion as a strengthening agent. The non-conductive rubber of this embodiment is such as to contain 40 to 100% of silica by weight ratio.

Next, a building method of the tread portion 2 of the tire T will be described.

FIG. 3 is a drawing explaining a method for building the tread portion 2 by winding a rubber strip member 10 extruded by an extruding machine 100, FIG. 4 is an exemplary drawing explaining a method for winding the rubber strip member 10 on to a rotational support element 120, and FIG. 5 is a sectional view showing a method for building the tread portion 2 by the use of the rubber strip member 10.

In a fabricating process of the tire T, the tread portion 2 of the tire T is formed by winding the rubber strip member 10 which is extruded from the extruding machine 100 as shown in FIG. 3 on to the rotational support element 120 such as a building drum or a green tire (not shown) on which bead portions are supported.

To describe in detail, the extruding machine 100 which extrudes the rubber strip member 10 includes, as is shown in FIG. 3, a pair of main body cases 102, 103 which are each formed into a cylindrical shape and in which rubber feeding screw shafts 107, 109 are provided respectively in interiors thereof, a pair of head portions 104, 105 which have gear pumps which are provided consecutively to distal ends of the main body cases 102, 103, respectively, a rubber coalescence portion 106 provided in common at distal ends of the head portions 104, 105 and an extruding die 108 which is added to a distal end of the rubber coalescence portion 106, so that a non-conductive rubber material Q2 is made to be supplied into an interior of the main body case 102 from a hopper 110 and a conductive rubber material Q1 is made to be supplied into an interior of the main body case 103 from a hopper 111. Both the rubber materials Q1, Q2 which are so supplied to the main body cases 102, 103 are fed forwards by virtue of rotation of the screw shafts 107, 109, respectively, and are then fed to the rubber coalescence portion 106 by the gear pumps of the head portions 104, 105 in such a manner as to realize required flow rates.

At the rubber coalescence portion 106, the rubber material Q1 and the rubber material Q2 are formed into shapes which correspond, respectively, to the conductive rubber region 12a and the non-conductive rubber region 14a and are then coalesced together, whereby a ribbon-shaped rubber strip member 10a whose cross section is, as is shown in FIG. 2A, divided into a conductive rubber region 12a and a non-conductive rubber region 14a is continuously extruded via the extruding die 108 whose discharge port 108a is formed into a shape matching the cross sectional shape of the rubber strip member 10.

In the extruding machine 100 configured as described above, by stopping the operations of the screw shaft 109 in the main body case 103 into which the conductive rubber material Q1 is supplied and the gear pump 105 from an extruding state of the rubber strip member 10a and controlling the screw shaft 107 in the other main body case 102 into which the non-conductive rubber material Q2 is supplied and the gear pump 104 in such a manner as to realize a predetermined flow rate of the rubber material which is fed to the rubber coalescence portion 106, a rubber strip member 10b which is made up of only a non-conductive rubber region 14b is continuously extruded from the extruding machine 100 without stopping the operation of the extruding machine 100. On the other hand, by causing the screw shaft 109 in the main body case 103 and the gear pump 105 of the extruding machine 100 which have been stopped from rotating to rotate at a predetermined speed from an extruding state of the rubber strip member 10b and controlling the screw shaft 107 in the other main body case 102 into which the non-conductive rubber material Q2 is supplied and the gear pump 104 to reduce their rotational speeds in such a manner as to realize the predetermined flow rate of the rubber material which is fed to the rubber coalescence portion 106, a rubber strip member 10a whose cross section is divided into a conductive rubber region 12a and a non-conductive rubber region 14a is continuously extruded without stopping the operation of the extruding machine 100.

In this way, the extruding machine 100 can extrude the two types of rubber strip members 10a, 10b which are different from each other in area ratio of the conductive rubber region relative to the cross section of the rubber strip member while switching therebetween at an arbitrary timing without stopping the operation of the extruding machine 100 by controlling the flow rates of the conductive rubber material Q1 and the non-conductive rubber material Q2 which are fed to the rubber coalescence portion 106.

The rubber strip members 10a, 10b which are extruded in the way described above are then wound on to the rotational support element 120 which is disposed in such a manner as to confront the extruding machine 100 via rolls 114 for introducing the rubber strip members 10a, 10b which are each extruded into a ribbon shape having a predetermined cross sectional shape from the extruding machine 100 to the rotational support element 120 while shaping properly the cross sectional shapes of the rubber strips 10a, 10b. The rotational support element 120 can rotate about a shaft 120a, and the rubber strip members 10a, 10b are wound along a tire circumferential direction while rotating the rotational support element 120 in a direction indicated by an arrow K in FIG. 3. The rubber strip members 10a, 10b which are so wound on to the rotational support element 120 are pressed against a winding surface 120b of the rotational support element 120 by a roller 116.

FIG. 4 is a view resulting when the rotational support element 120 of the building drum is viewed thereabove, and an arrow A denotes the tire circumferential direction, and an arrow B denotes a tire width direction (axial direction). When winding spirally the rubber strip members 10a, 10b along the tire circumferential direction, not only by rotating the rotational support element 120 but also by shifting either the extruding machine 100 or the rotational support element 120 along the tire width direction so as to relatively shift the extruding machine 100 along the tire width direction B, the adjacent rubber strip members 10a, 10b are wound in a partially overlapping fashion. As this occurs, as is shown in FIG. 10, by controlling the relative shifting speed in the tire width direction B, an overlapping amount S between the adjacent rubber strip members is adjusted, so as to control an inclination angle β of the rubber strip members 10a, 10b relative to the winding surface 120b of the rotational support element 120 in such a manner as to become a predetermined value. The operations of the extruding machine 100 and the rotational support element 120 are controlled by a control unit 130.

In building the tread portion 2 on a belt portion 6 formed on the winding surface 120b of the rotational support element 120 by the use of the extruding machine 100 constituted as described above, firstly, by controlling the screw shaft 107 in the other main body case 102 into which the non-conductive rubber material Q2 is supplied and the gear pump 104 in such a manner as that the rubber material is fed to the rubber coalescence portion 106 at the predetermined flow rate, as is shown in FIG. 5, the rubber strip member 10b is extruded by the extruding machine 100, and the rubber strip member 10b so extruded is wound on to the rotational support element 120 while shifting the rubber strip member 10b from a winding starting position P1 at a central portion of the rotational support element 120, which corresponds to a central portion of the tread portion 2, towards one end portion (for example, a right end portion) in the tire width direction.

Following this, when the rubber strip member 10b reaches a position P2 which corresponds to the shoulder portion 2a, from the midst of the winding operation of the rubber strip member 10b, the screw shaft 109 in the man body case 103 into which the conductive rubber material Q1 is supplied and the gear pump 105 of the extruding machine 100 are caused to rotate at a predetermined speed, while the screw shaft 107 in the other main body case 102 into which the non-conductive rubber material Q2 is supplied and the gear pump 105 are controlled to reduce their rotational speeds in such a manner that the predetermined flow rate of the rubber material that is fed to the rubber coalescence portion 106 is realized. By controlling the extruding machine 100 in the way described above, the rubber strip member 10a is extruded from the extruding machine 100 without any interruption so as to be supplied to the rotational support element 120, and when the rubber strip member 10a reaches a right end, the rubber strip member 10a is folded to a tire outer circumferential side, so as to continue to be wound while being shifted from the right end towards the other end portion (a left end portion) in the tire width direction, whereby the shoulder portion 2a of the tread portion 2 is built. In the shoulder portion 2a so formed, since the spiral direction becomes opposite before and after where the rubber strip portion 10a is folded back, there is produced a portion where the rubber strip member 10 intersects itself. At this intersecting portion, by the conductive rubber region 12a of the rubber strip member 10a being brought into contact with itself as a result of the rubber strip member 10a being so folded back, a conductive path 2c is formed for releasing static electricity from a belt layer 6 lying underneath the tread portion 2 to the surface of the tread.

Following this, when the rubber strip member 10a reaches a position P3 which corresponds to the tread central portion 2b, from the midst of the winding operation of the rubber strip member 10a, the screw shaft 109 in the main body case 103 into which the conductive rubber material Q1 is supplied and the gear pump 1003 of the extruding machine 100 are stopped from operating, while the screw shaft 107 in the other main body case 102 into which the non-conductive rubber material Q2 is supplied and the gear pump 105 are controlled to reduce their rotational speeds in such a manner that the predetermined flow rate of the rubber material that is fed to the rubber coalescence portion 106 is realized. By controlling the extruding machine 100 in the way described above, a rubber strip member 10b is extruded from the extruding machine 100 without any interruption so as to be supplied to the rotational support element 120, and the rubber strip member 10b is wound on to the rotational support element 120 while being shifted leftwards towards the left end portion, so that the tread central portion 2b of the tread portion 2 is built.

Following this, when the rubber strip member 10b reaches a position P4 which corresponds to the shoulder portion 2a, from the midst of the winding operation of the rubber strip member 10b, by controlling the extruding machine 100 in such a manner that the screw shafts 107, 109 and the gear pumps 104, 105 are caused to rotate at the predetermined speeds in the way described above so as to realize predetermined flow rates of the rubber materials Q1, Q2 which are fed to the rubber coalescence portion 106, a rubber strip material 10a is extruded from the extruding machine 100 so as to be supplied to the rotational support element 120 and is wound on thereto while being shifted from the right to the left. When the rubber strip member 10a reaches the left end, the rubber strip member 10a is folded towards the tire outer circumferential side, so as to continue to be wound while being shifted from the left to the right, whereby the shoulder portion 2a of the tread portion 2 is built. As with what has been described above, in the shoulder portion 2a so built, in the portion where the rubber strip material 10a intersects itself, by the conductive rubber region 12a of the rubber strip member 10a being brought into contact with itself as a result of the rubber strip member 10a being so folded back, a conductive path 2c is formed for releasing static electricity from a belt layer 6 lying underneath the tread portion 2 to the surface of the tread.

Following this, when the rubber strip member 10a reaches a position P5 which corresponds to the tread central portion 2b, from the midst of the winding operation of the rubber strip member 10a, by controlling the extruding machine 100 in the way described above, a rubber strip member 10b is extruded from the extruding machine 100 so as to be supplied to the rotational support element 120, and the rubber strip material 10b is wound while being shifted to the right, whereby the tread central portion 2b of the tread portion 2 is built, and the tread portion 2 is completed.

As has been described heretofore, by winding the rubber strip materials 10a, 10b whose area ratios are made to differ in the tire width direction on to the rotational support element 120 in such a manner that the area ratio of the conductive rubber area 12 relative to the cross section of the rubber strip member 10 becomes larger, as is shown in FIG. 5, the tread portion 2 can be formed which includes a shoulder portion 2a which is made of the conductive rubber material and the non-conductive rubber material and is imparted a static elimination function and the tread central portion 2b made of the non-conductive rubber material between the shoulder portions 2a.

In addition, in this embodiment, in building the tread portion 2 by winding the rubber strip member 10 on to the rotational support element 120, winding is started from the central portion of the rotational support element 120 which corresponds to the central portion of the tread portion 2, and the rubber strip member 10 is shifted towards the one side portion in the tire width direction. Then, when the rubber strip member 10 reaches the one end portion, the rubber strip member 10 is folded towards the tire outer circumferential side so as to continue to be wound while being shifted from the right end towards the left end portion in the tire width direction. Then, when the rubber strip material 10 reaches the other end portion, the rubber strip material 10 is folded towards the tire outer circumferential side so as to continue to be shifted from the left end towards the right end portion in the tire width direction to thereby be wound to a position which is substantially coincident with the winding starting position. Thus, since the rubber strip material 10 is wound into a substantially S-shaped fashion, the balance between both the sides in the tire width direction can be increased.

Note that while in the embodiment, as the rubber strip material 10a which makes up the shoulder portions 2a, the rubber strip material 10a is employed in which the area ratio of the conductive rubber region 12a relative to the cross section of the rubber strip material 10a is constant, for example, the area ratio of the conductive rubber region 12a relative to the cross section of the rubber strip material 10a may be made to decrease as the rubber strip material 10a extends towards the end portion in the tire width direction at the shoulder portion 2a, whereby the amount of the conductive rubber used can be reduced, so as to realize a further reduction in rolling resistance.

Modified Examples

Next, modified examples of the invention will be described based on the drawings. FIG. 6 is a sectional view of a time T2 which is fabricated by a fabrication method according to the modified example. As is shown in FIG. 6, the modified example differs from the first embodiment in that a base rubber portion 8 made of a conductive rubber material is provided between a belt layer 6 and a tread portion 2. Note that like reference numerals will be imparted to constitutions in common with those of the first embodiment, so as to omit the description thereof.

The base rubber portion 8 is built by winding a rubber strip material 10c which is extruded from the aforesaid extruding machine 100 on to a belt portion 6 which is formed on a winding surface 120b of a rotational support element 120 in an overlapping fashion.

Specifically, as is shown in FIG. 3, by stopping the screw shaft 107 in the main body case 102 into which the non-conductive material Q2 is supplied to the rubber coalescence portion 106 and the gear pump 104 and controlling the screw shaft 109 in the other main body case 103 into which the conductive rubber material Q1 is supplied and the gear pump 105 in such a manner as to realize a predetermined flow rate of the rubber material fed to the rubber coalescence portion 106 of the extruding machine 100, a rubber strip 10c which is, as is shown in FIG. 7, made of only a conductive rubber region 12c is continuously extruded from the extruding machine 100.

As is shown in FIG. 7, the rubber strip material 10c so extruded from the extruding machine 100 is started to be wound from one side portion (for example, a right side portion) S1 in the tire width direction and continues to be wound while being shifted towards one end portion (for example, a right end). When the rubber strip material 10c reaches the right end, the rubber strip material 10c is folded towards the tire outer circumferential side so as to continue to be wound while being shifted from the right to the left. In addition, when the rubber strip material 10c reaches a left end, the rubber strip material 10c is folded towards the tire outer circumferential side, so as to continue to be wound while being shifted from the left to the right to thereby build the base rubber portion 8.

Note that while in this modified example, the base rubber portion 8 is built by winding spirally the rubber strip material 10c on to the belt layer 6 held on the winding surface 120b of the rotational support element 120, the base rubber portion 8 may be built on the belt layer 6 by, for example, winding a base rubber member 8a which is formed to a predetermined length which corresponds to a length in the tire width direction of the base rubber portion 8 on to the belt layer 6 held on the winding surface 120b of the rotational support element 120. As this occurs, as is shown in FIG. 9, the base rubber member 8a may be such as to have a conductive rubber layer 8c which is electrically conductive with the shoulder portions 2a of the tread portion 2 on the base portion 8b made up of the non-conductive rubber material, and by employing the base rubber member 8a as described above, the base rubber portion 8 can be interposed between the belt layer 6 and the tread portion 2 without deteriorating the static elimination performance and rolling resistance.

DESCRIPTION OF REFERENCE NUMERALS AND CHARACTERS

Figure 1:
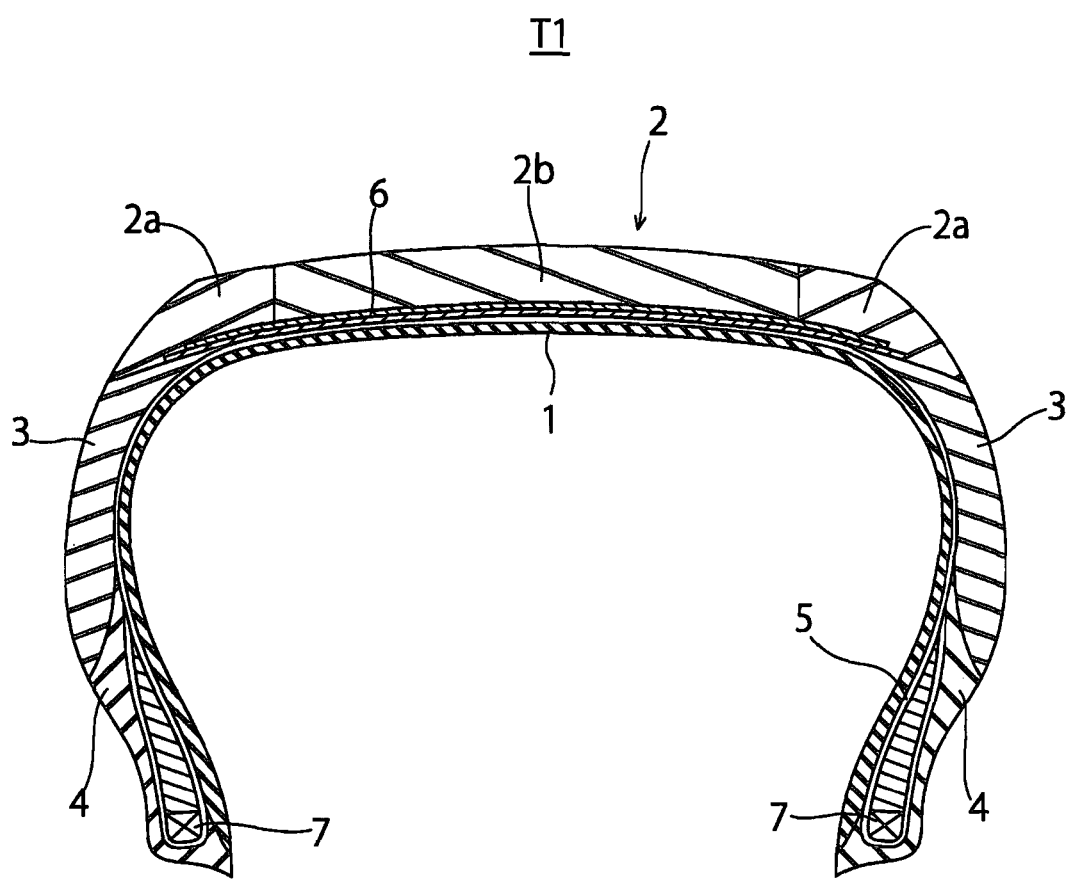
FIG. 1 A sectional view showing an example of a pneumatic tire fabricated by a fabrication method according to a first embodiment.
Figure 2A:
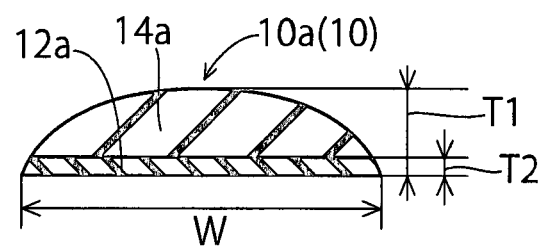
FIG. 2A A sectional view of a rubber strip material employed in the fabrication method according to the embodiment.
Figure 2B:
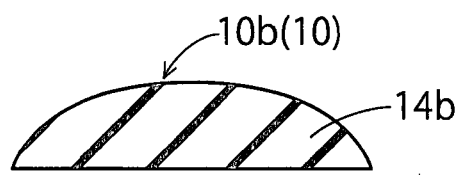
FIG. 2B A sectional view of a rubber strip material employed in the fabrication method according to the embodiment.
Figure 3:
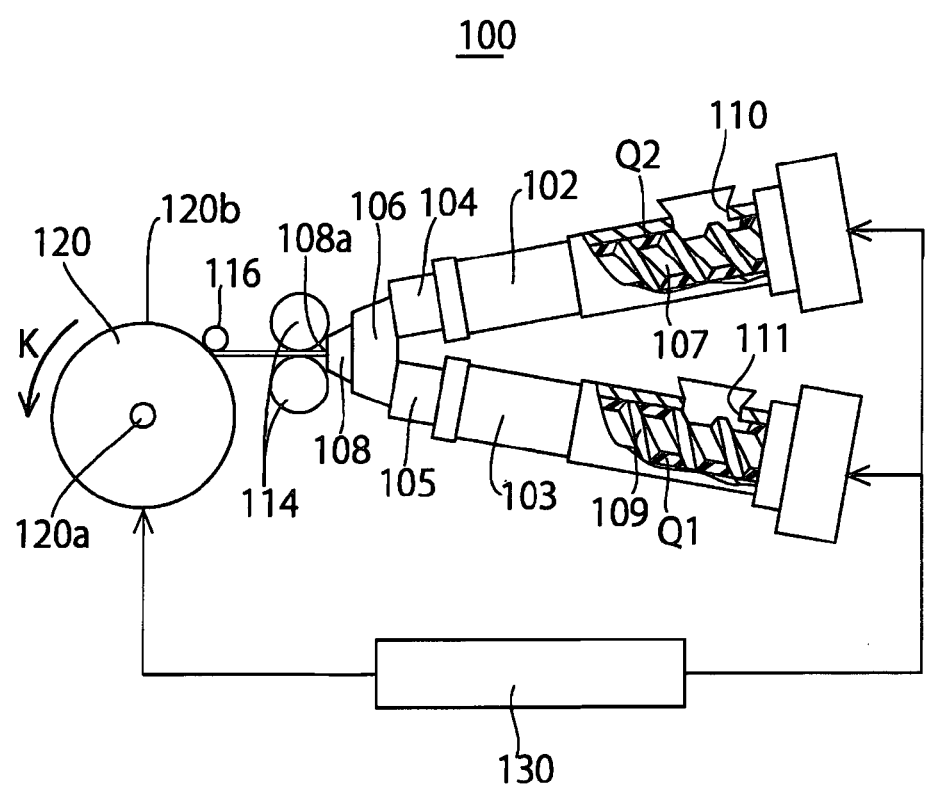
FIG. 3 A drawing explaining a method for building a tread portion by winding a rubber strip member which is extruded by an extruding machine.
Figure 4:
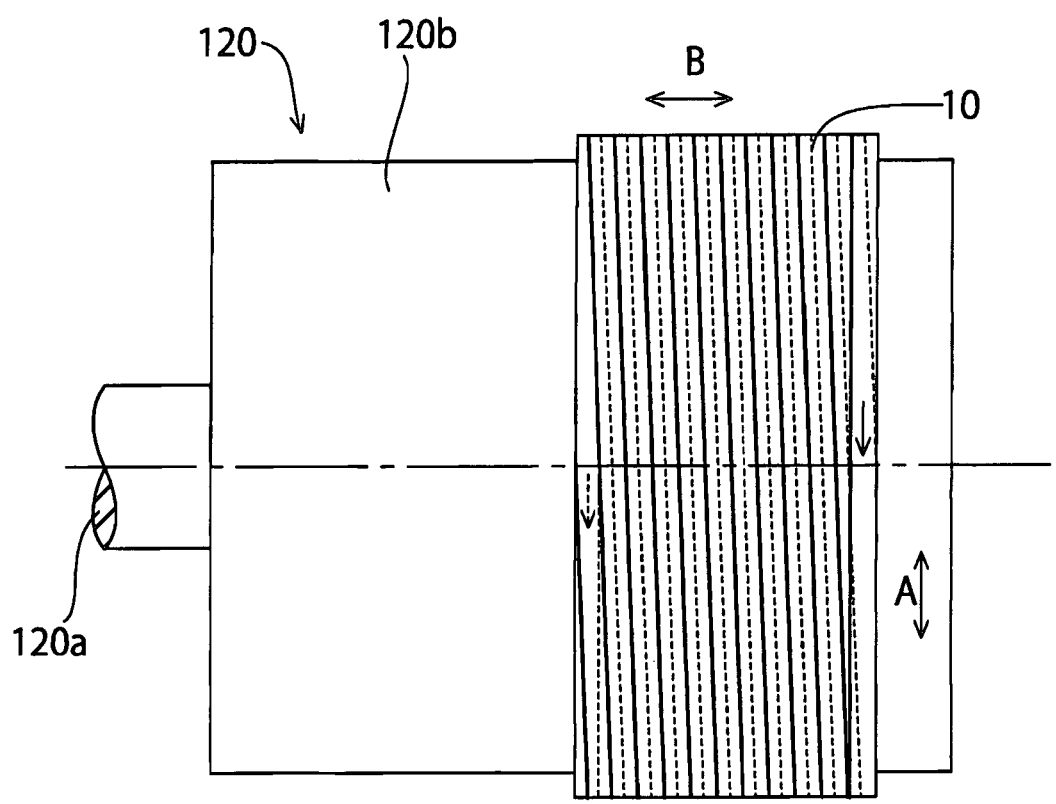
FIG. 4 A plan view explaining a winding method of the rubber strip material.
Figure 5:
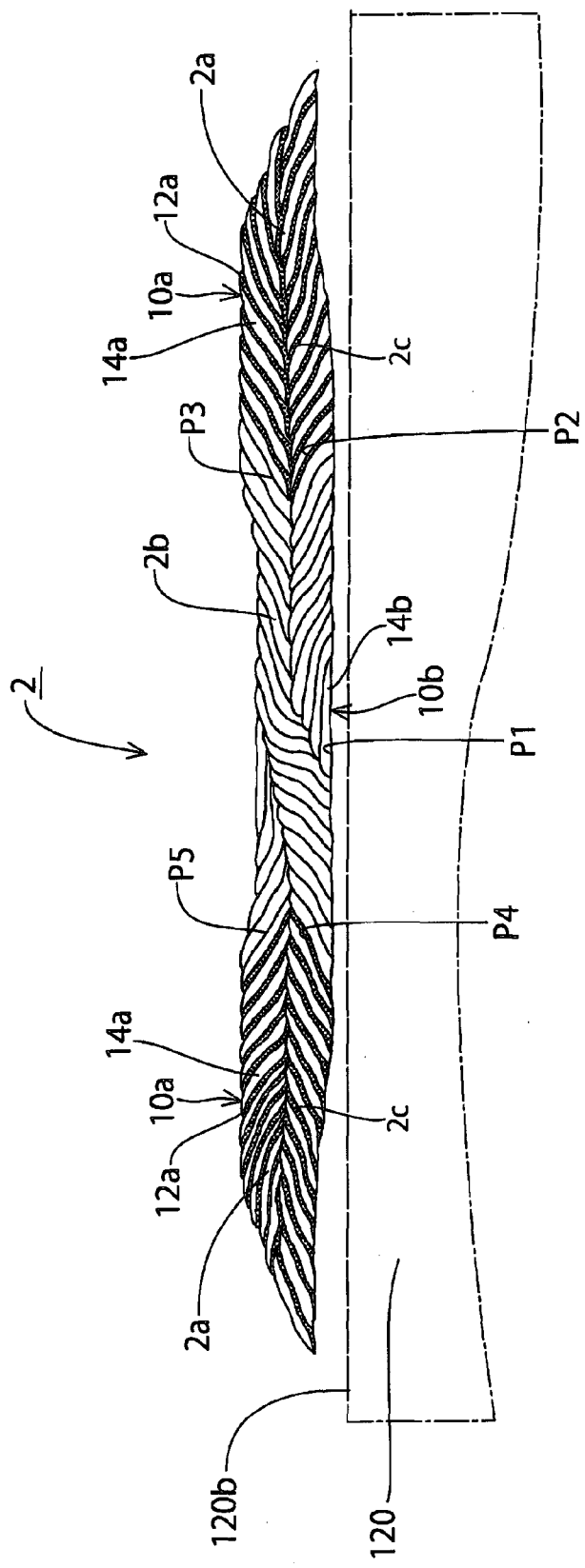
FIG. 5 A sectional view showing a method for building the tread portion by employing the rubber strip material.
Figure 6:
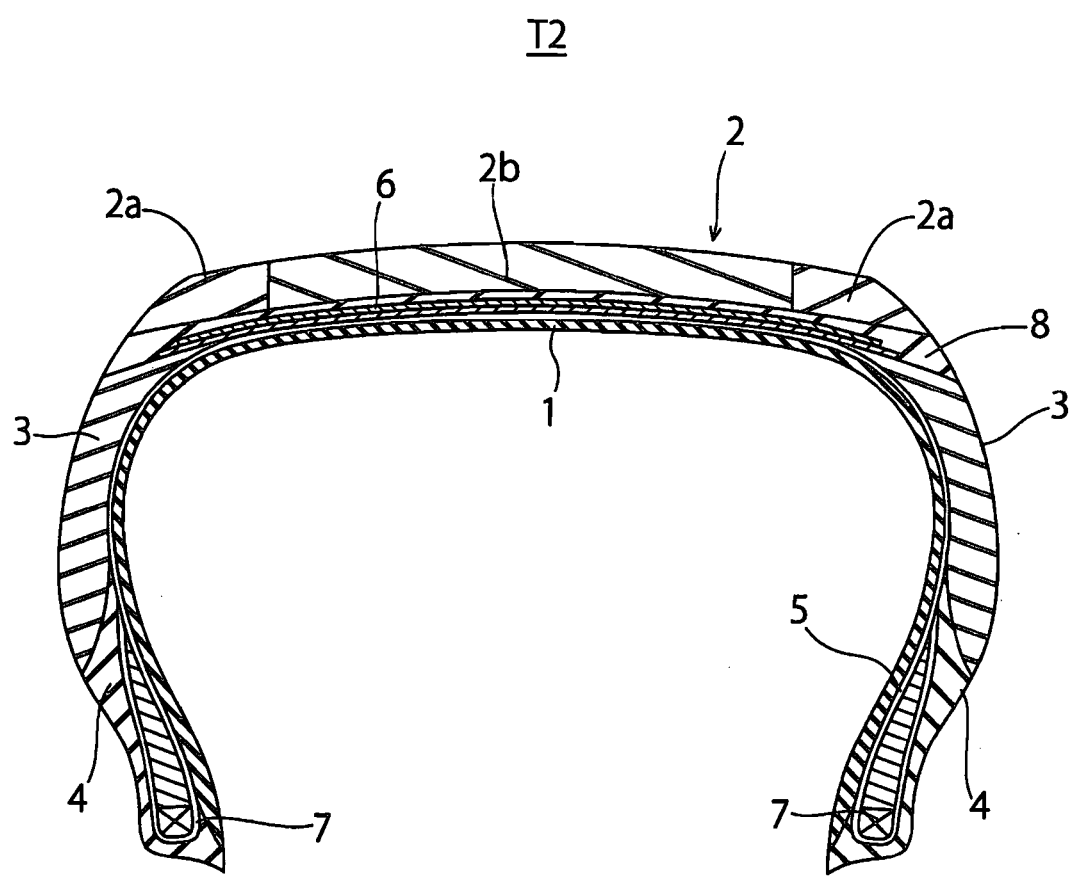
FIG. 6 A sectional view showing an example of a pneumatic tire fabricated by a fabrication method according to a modified example.
Figure 7:
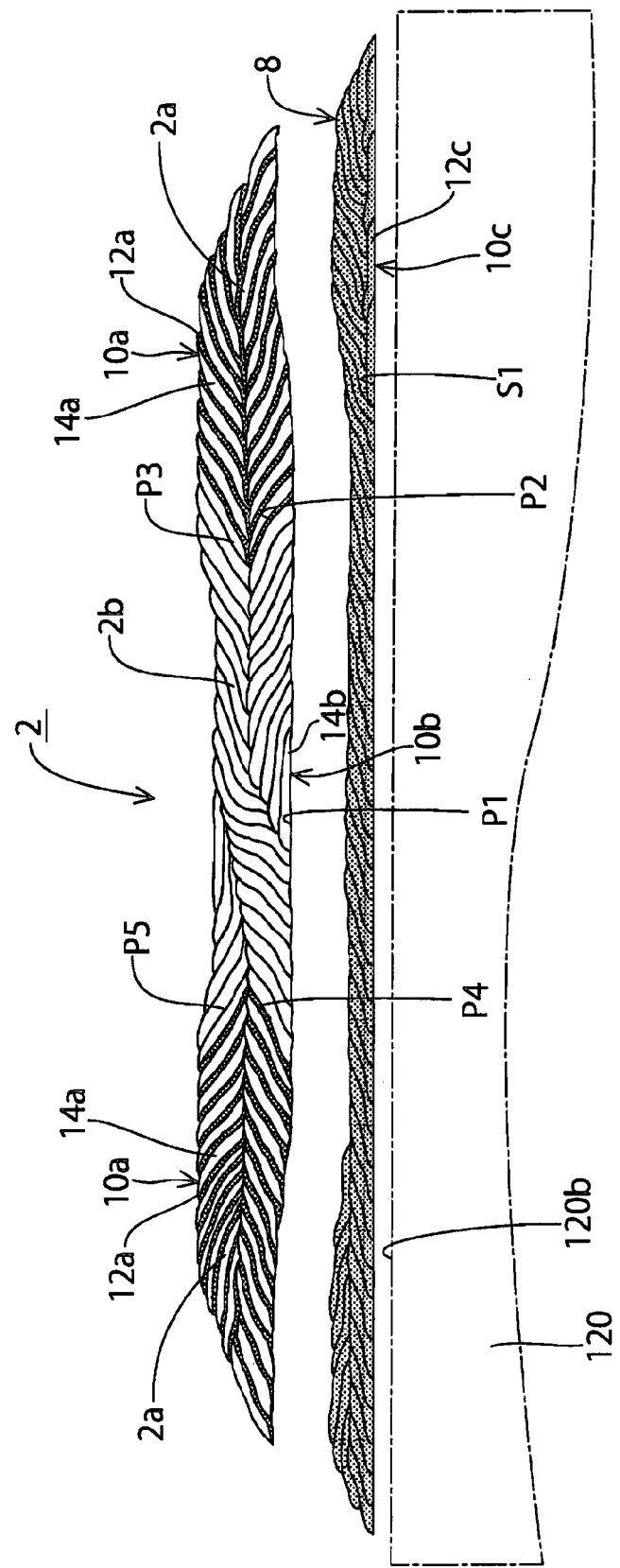
FIG. 7 A sectional view showing a method for building a base rubber portion and a tread portion according to the modified example.
Figure 8:
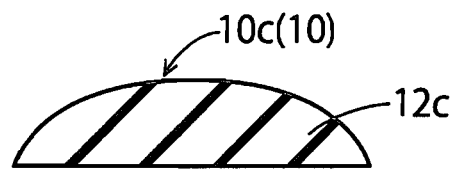
FIG. 8 A sectional view of a rubber strip material which is employed to build the base rubber portion.
Figure 9:
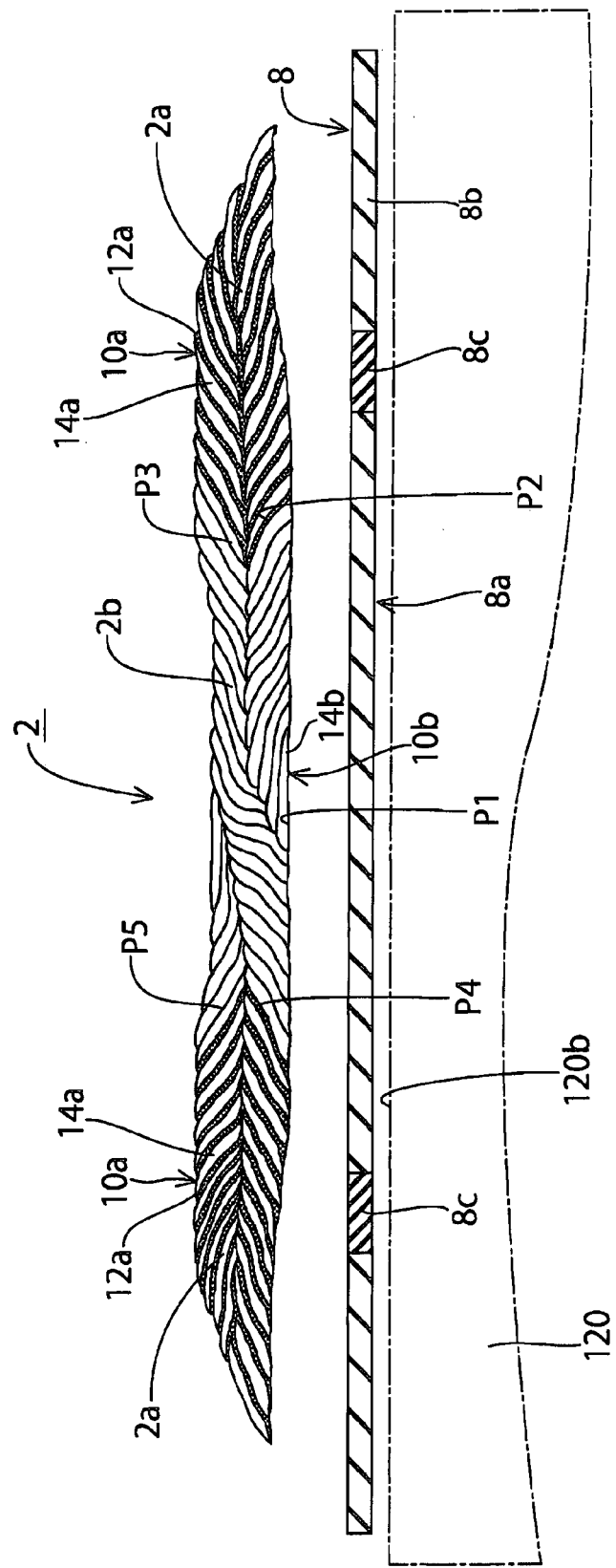
FIG. 9 A sectional view of a base rubber portion and a tread portion according to a further modified example.
Figure 10:
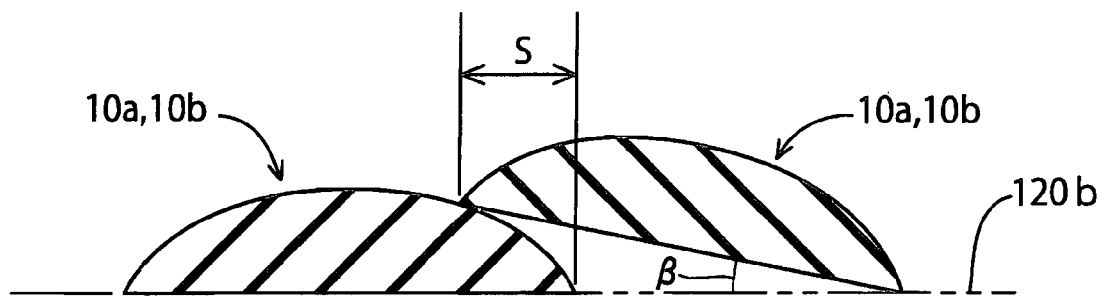
FIG. 10 A sectional view explaining a winding method of a rubber strip material.

1 . . . inner liner rubber portion
2 . . . tread rubber portion
2a . . . shoulder portion
2b . . . tread central portion
2c . . . conductive path
3 . . . side wall rubber portion
4 . . . rim strip rubber portion
5 . . . carcass layer
6 . . . belt layer
7 . . . bead portion
8 . . . base rubber portion
10, 10a, 10b, 10c . . . rubber strip material
12a, 12c . . . first area (conductive rubber material)
14a, 14b . . . second region (non-conductive rubber material)
100 . . . extruding machine
102, 103 . . . main body case
104, 105 . . . head portion
106 . . . rubber coalescence portion
107 . . . screw
108 . . . building die
108a . . . charge port
109 . . . screw
110, 111 . . . hopper
114 . . . calendar roll
116 . . . roller
120 . . . rotational support element
120a . . . rotational shaft
120b . . . winding surface
130 . . . control unit
T1, T2 . . . tire
Q1 . . . conductive rubber material
Q2 . . . non-conductive rubber material

The invention claimed is:

1. A method of fabricating a pneumatic tire for forming a tread portion by winding spirally a rubber strip member in a circumferential direction of a tire in a partially overlapping fashion, comprising:
by an extruding machine, extruding continuously a rubber strip member whose cross section is divided into a first region which is made up of a conductive rubber and a second region which is made up of a non-conductive rubber, and
winding the rubber strip member on to a rotational support element while changing an area ratio of the first region relative to a cross section of the rubber strip member in a tire width direction,
wherein the rubber strip member made up of only the non-conductive rubber is used at a time of starting winding the rubber strip member and at a time of finishing winding the rubber strip member,
wherein the rubber strip member made up of the conductive rubber and the non-conductive rubber is used in the midst of winding the rubber strip member,
wherein in the extruding step, the extruding machine forms the conductive rubber into the shape of the first region and the non-conductive rubber into the shape of the second region and then coalesces the conductive rubber and the non-conductive rubber together to form the rubber strip member whose cross section is divided into the first region and the second region,
wherein the rubber strip member is extruded in such a manner that an area ratio of the first region in both side portions in the tire width direction becomes larger than in a central portion in the tire width direction,
wherein a base rubber portion is wound on the rotational support element in advance before the rubber strip member is wound on the rotational support element, and wherein the base rubber portion includes a base portion made up of a non-conductive rubber material and a conductive rubber layer made up of a conductive rubber material.

2. The method of fabricating a pneumatic tire as set forth in claim 1, wherein the first region is provided wider than the second region.

3. The method of fabricating a pneumatic tire as set forth in claim 1, wherein the rubber strip member is extruded into a cross sectional shape whose thickness is gradually reduced from a widthwise central portion towards both sides thereof.

4. The method of fabricating a pneumatic tire as set forth in claim 1, further comprising:
when the rubber strip member reaches an end in the tire width direction, winding the rubber strip member in an opposite direction toward another end in the tire width direction so as to bring surfaces of the first region into contact with one another to form a conductive path from an underneath of the tread portion to a surface thereof.

5. The method of fabricating a pneumatic tire as set forth in claim 1, wherein the rubber strip member made up of only the non-conductive rubber is wound around a central portion of the tread portion in the tire width direction, and
wherein the rubber strip member made up of the conductive rubber and the non-conductive rubber is wound around a fold-back portion of the tread portion at an end in the tire width direction.

6. The method of fabricating a pneumatic tire as set forth in claim 5, wherein the first region is provided wider than the second region.

7. The method of fabricating a pneumatic tire as set forth in claim 5, wherein the rubber strip member is extruded into a cross sectional shape whose thickness is gradually reduced from a widthwise central portion towards both sides thereof.

8. The method of fabricating a pneumatic tire as set forth in claim 1, wherein the conductive rubber layer is in contact with the first region of the rubber strip member wound on both ends in the tire width direction.

* * * * *